(12) United States Patent
Skog

(10) Patent No.: US 6,189,565 B1
(45) Date of Patent: Feb. 20, 2001

(54) VALVE WITH LIGHT EMITTING AND DETECTING AND DETECTING ARRANGEMENT FOR MONITORING OPENING AND CLOSING OF THE VALVE

(75) Inventor: Göran Skog, Bromma (SE)

(73) Assignee: Siemens-Elema AB, Solna (SE)

( * ) Notice: Under 35 U.S.C. 154(b), the term of this patent shall be extended for 0 days.

(21) Appl. No.: 09/318,759

(22) Filed: May 26, 1999

(51) Int. Cl.[7] .................................................. F16K 37/00
(52) U.S. Cl. ........................................... 137/554; 137/552
(58) Field of Search .................................. 137/554, 553, 137/552

(56) References Cited

U.S. PATENT DOCUMENTS 5,202,673 * 4/1993 Conrad ............................. 137/554 X
5,265,594 11/1993 Olsson et al. .
5,584,319 12/1996 Cholin .
5,764,053 6/1998 Chang .

FOREIGN PATENT DOCUMENTS 0 063 010 10/1982 (EP) .
0 603 592 6/1994 (EP) .
149 286 5/1981 (NO) .

* cited by examiner

Primary Examiner—Kevin Lee
(74) Attorney, Agent, or Firm—Schiff Hardin & Waite

(57) ABSTRACT

A valve arrangement includes a variable aperture through which fluid may flow, a closure element adjustable to vary the size of the aperture, and a sensor unit which generates an output signal dependent on the aperture size. The sensor unit has a light detector disposed downstream of the aperture to detect light passed through the aperture and to generate the output signal dependent on the detection of the light. This signal is supplied to a visual display unit having indicators that are respectively activated to show if the valve is open or closed.

9 Claims, 3 Drawing Sheets

VALVE WITH LIGHT EMITTING AND DETECTING AND DETECTING ARRANGEMENT FOR MONITORING OPENING AND CLOSING OF THE VALVE

BACKGROUND OF THE INVENTION

1. Field of the Invention

The present invention relates to a valve arrangement and in particular to a valve arrangement in which the operation of the valve can be automatically monitored.

2. Description of the Prior Art

Automatic monitoring of the operation of a valve, i.e., its opening and closing, is particularly useful when the valve is used in conditions wherein safety is critical or in precise control conditions. Such conditions as may exist, for example, in patient ventilator systems where the operation of valves must be precisely controlled in order to ensure that a correct dose of anaesthetic is delivered to a patient.

A valve arrangement, useable in patient ventilators, is described in U.S. Pat. No. 5,265,594 and includes a variable aperture through which fluid may flow. A resilient diaphragm closure elements is also provided which is adjustable to vary the size of the aperture in response to the action of a co-operating valve stem, part of which forms a moveable solenoid core. A sensor unit is also provided which senses the aperture size by monitoring the electrical properties of an electrical circuit that includes the solenoid and valve stem. In this way the position of the valve stem within the solenoid can be determined and hence an indication of the degree of opening of the aperture is obtained. A signal is emitted from the sensor unit indicating the aperture size or changes therein, which is used to control the current supplied to the solenoid.

A further valve arrangement, useable in fire protection sprinkler systems, is described in U.S. Pat. No. 5,584,319 and includes an optical sensor unit from which a signal is emitted indicating whether the valve is open. Light from the sensor unit is reflected from a valve stem and detected by a photodetector only when the valve stem is moved to unblock an aperture and open the valve.

Both valve arrangements operate by monitoring the position of the valve stem from which the position of a closure element, and hence the size of the aperture is inferred. In certain circumstances, for example as the valve arrangement becomes worn, the valve stem may move before any changes in the size of the valve aperture occurs and so may cause erroneous signals to be emitted from the sensor unit. Moreover, sticking of the closure element, may again cause measurements made based on the valve stem to provide erroneous signals output from the sensor unit.

SUMMARY OF THE INVENTION

An object of the present invention is to provide a valve arrangement which alleviates at least one of the aforementioned problems associated with prior art arrangements.

The above object is achieved in accordance with the principles of the present invention in a valve arrangement having a variable aperture through which fluid flows, a closure element which is adjustable to vary the size of the aperture, and a sensor unit which generates an output signal dependent on the aperture size, the sensor unit including a light detector positioned to detect light which has passed through the aperture. The detector unit generates the aforementioned output signal dependent on the detection of light passed through the aperture.

Thus, by sensing light, which may be ambient light or light from a dedicated source, which passes through the aperture of the valve its opening and closing can be monitored directly. The sensed light is used to produce an output signal from the sensor unit indicative of the actual size of the aperture, or simply indicative of whether the valve is open or closed.

Preferably, the sensor unit includes a radiation detector and a complementary radiation source, the detector and source respectively being positionable upstream and downstream of the fluid flow on opposite sides of the aperture. This enables the valve arrangement to be used in the absence of ambient light.

The detector can provide an output proportional to the level of incident radiation, and this output can then be used in the calculation of the size of the aperture open to fluid flow.

The sensor unit also may be capable of monitoring the rate of change of the aperture size which may, for example, be used to determine the presence of unwanted oscillations in the valve opening.

The detector can be configured to provide a number of outputs, each indicative of light having passed through an associated region of the aperture. The respective outputs can be used to monitor the operation of the associated regions of the aperture and may, for example, provide a more accurate calculation of the size, or identify uneven opening, of the aperture.

In an embodiment of the arrangement according to the invention the fluid flow rate is automatically controlled in order to achieve a desired flow. This is accomplished by causing the sensor unit to emit a signal indicative of the actual size of the aperture and by providing a controller which measures the pressure difference upstream and downstream of the aperture, receives the output signal emitted from the sensor unit, and determines a flow rate from the measured pressure difference and the aperture size.

DESCRIPTION OF THE PREFERRED EMBODIMENTS

Figure 1:
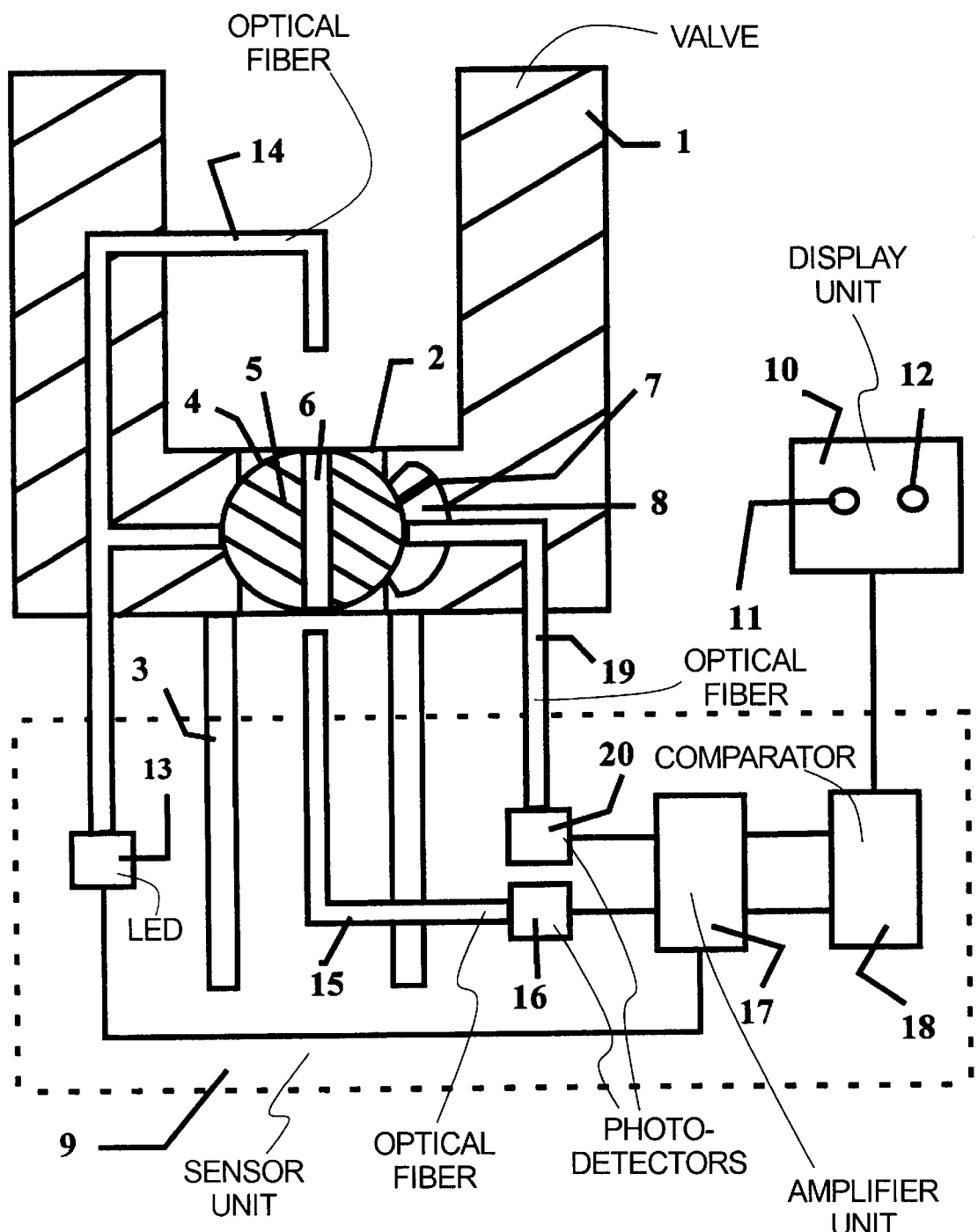
FIG. 1 is a schematic illustration of a valve arrangement according to the present invention with automatic on/off detection.

In FIG. 1, a portion of a valve 1 is shown having an aperture 2 through which fluid may flow connected to a conduit 3. A closure element 4 having a fluid impermeable body 5 through which passes a fluid channel 6 is provided in fluid tight connection with the aperture 2. The closure element 4 is mounted so as to be rotatable within the aperture 2 between a closed position in which the channel 6 is substantially perpendicular to the direction of fluid flow through the aperture 2 and an open position in which the channel 6 is substantially parallel to the flow direction, so as to vary the size of the aperture 2 through which fluid may flow. A projection 7 is provided on the closure element 4 which travels in a groove 8 within the wall of the valve 1 as the closure means 4 rotates. The projection 7 and groove 8 are cooperatively arranged to stop the rotation of the closure element 4 at the fully open and the fully closed positions.

A sensor unit 9 is provided to sense changes in the size of the aperture 2 corresponding to the valve 1 being fully open and the valve being fully closed 2 and to emit a signal to a display unit 10 which displays the operational status (open or closed) of the valve 1. The display unit 10 may simply have two visual indicators 11,12 which are actuated in a mutually exclusive manner when the valve 1 is respectively open and closed.

The sensor unit 9 includes a light emitting diode (LED) as a light source 13 which is operated to provide a pulsed output at a known frequency. A first optical fiber 14 is arranged to conduct light from the LED 13 into the valve 1 so that light from the LED 13 passes through the channel 6 of the closure element 4 when in either the fully opened or the fully closed position. A second optical fiber 15 is arranged within the conduit 3 to capture light passing from the first optical fiber through the conduit 6, along the direction of fluid flow, as the closure element 4 is rotated to open the valve 1. The second optical fiber 15 conveys the captured light to an associated photodetector 16 where it produces an electrical signal proportional to its intensity. The electrical signal from the photodetector 16 is passed to a phase sensitive detector and amplifier unit 17 which is operated at the pulse frequency of the LED 13. Any amplified electrical signal of the correct frequency and phase is then passed to a comparator 18 where its amplitude is compared with a reference amplitude and from which a signal is emitted to activate one of the visual indicators 11,12 only when the amplitude of signal from the unit 17 matches or exceeds the reference amplitude (the other of the indicators 11,12 is activated by default as long as the reference is not exceeded). In this way problems with false signals, for example caused by only a partially open valve 1, can be reduced.

A third optical fiber 19 is also included within the sensor unit 9 and is arranged within the wall of the valve 1 to capture light passing from the first optical fiber 24 through the conduit 6, perpendicular to the direction of fluid flow, when the closure means 4 is rotated to close the valve 1. The third optical fiber 19 conveys the captured light to an associated photodetector 20 where it produces an electrical signal proportional to its intensity. The electrical signal from the photodetector 20 is passed to the unit 17 and onward to the comparator 18 and processed in a manner similar to that described above for the situation in which the valve 1 is open.

Figure 2:
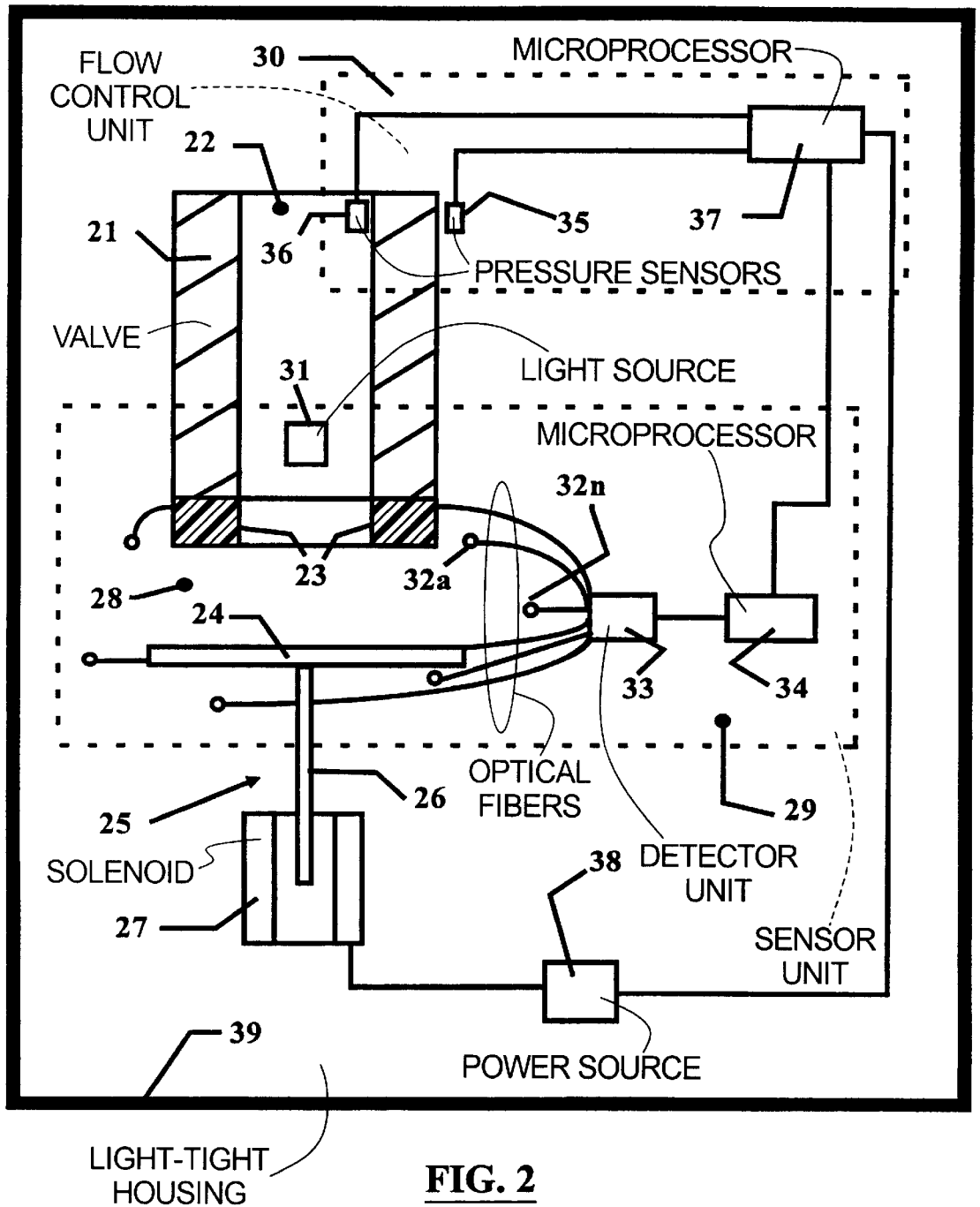
FIG. 2 is a schematic illustration of an alternative embodiment of a valve arrangement according to the present invention including automatic opening control.

FIG. 2 shows the inventive arrangement in the context of a solenoid type valve arrangement. The general operating principles of a solenoid type valve are well-known in the art and so will be provided only in sufficient detail to facilitate the understanding of the use of the invention in combination therewith.

A valve 21 is provided with an open end 22 with an open periphery, around which a resilient sealing member 23 is used against a sealing head 24 of a closure member 25, to close the valve 21. A valve stem 26 of the closure member 25 is operatively connected to the sealing head 24 and forms a moveable core of a solenoid 27. Thus by varying the current through the solenoid 27 the valve stem 26 is caused to move 35 to vary the relative position of the sealing head 24 with respect to the sealing member 23. This movement thereby produces a consequent variation in the size of the aperture 28 through which fluid may flow.

The valve arrangement also has a sensor unit 29 which monitors light passing through the aperture 28, and calculates the area $A_{ap}$ of the aperture 28 therefrom and supplies an output signal corresponding to the calculated area to a flow control unit 30.

The sensor unit 29 includes a light source 31, light receivers 32a . . . n, a detector unit 33 and a microprocessor 34. The light source 32 is located within the open end 22 of the valve 21 and provides a uniform illumination across the entire aperture 28. A number of optical fibers form the receivers, 32a . . . n which collect light from the source 31 after it has passed through the aperture 28. The fibers 32a . . . n are disposed so as to respectively collect light passing through a different associated region of the aperture 28, and conduct the collected light to the detector unit 33 (for example a single photodetector) which provides an electrical output signal proportional to the integrated intensity of the light from all of the fibers 32a . . . n. The detector unit 33 may also be capable of discriminating between the light from each of the fibers 32a . . . n (for example, by replacing the single detector with a detector for each fiber 32a . . . n) so that variations in the intensity of the light collected by each fiber 32a . . . n can be used to determine if the valve is opening correctly, for example whether any part of the sealing head 24 is sticking to the resilient sealing member 23.

The output signal from the detector unit 33 representing the integrated light intensity is provided to the microprocessor 34 which uses this output together with a value of the intensity of the light output from the light source 31 (which value may be predetermined, or calculated within the microprocessor 34 from a knowledge of the operating characteristics of the light source 31 and the power supplied to it, or directly measured using a further detector unit) in the calculation of the area of the aperture 28. A flow control unit 30 has pressure sensors 35,36 located to measure fluid pressure respectively upstream ($P_{up}$) and downstream ($P_{down}$) of the fluid flow, on opposite sides of the aperture 28. A microprocessor 37 is configured to determine the ratio $Pr=P_{up}P_{down}$ between the two pressures measured by the sensors 35,36. Obviously, a single microprocessor may be used to replace the microprocessors 34,37 of the sensor unit 29 and the control unit 30 respectively. The output from the sensor unit 29 representing the calculated size $A_{ap}$ of the aperture 28 also is supplied to the microprocessor 37 of the control unit 30 and the microprocessor 37 is programmed to calculate the volume flow $Q_{vol}$ using the known relationship:

$$Q_{vol}=K \cdot P_r \cdot A_{ap} \qquad (1)$$

where K is a constant dependent on the gas used and the temperature.

The microprocessor 37 is also programmed to compare the calculated flow value with a desired flow value and to supply a control signal to the solenoid power source 38 to vary the current through the solenoid so to vary the area of the aperture 28 to bring the calculated and desired flow values to coincidence. The entire valve arrangement can be enclosed in a light-tight housing 39 to exclude unwanted ambient light.

In certain situations, particularly where there is only a small pressure difference between the fluid inside and outside of the valve 21, oscillations in the position of the closure member 25 may occur which can lead to undesirable oscillations in the flow of fluid from the valve 21. For example, the solenoid power source 38 may be operated so that fluid at a particular pressure inside the valve 21 forces the closure member 25 open to produce a predetermined size of the aperture 28 and hence a predetermined flow. As the closure member 25 moves to open, however, then the pressure of the fluid within the valve 21 drops. This may cause the closure member 25 to move to close the aperture 28, thus increasing the pressure of the fluid within the valve 21. The increased pressure then acts to move the closure member 25 to open again and thus oscillatory movements in the closure member 25 may be generated.

Therefore, the sensor unit 29 can additionally or alternatively detect oscillations in the movement of the closure member 25, for example by the microprocessor 34 determining the rate of change of the area of the aperture 28. Upon detection of oscillatory movements the flow control unit 30 can be operated to control the solenoid power source 38 to eliminate the oscillations.

Figure 3A:
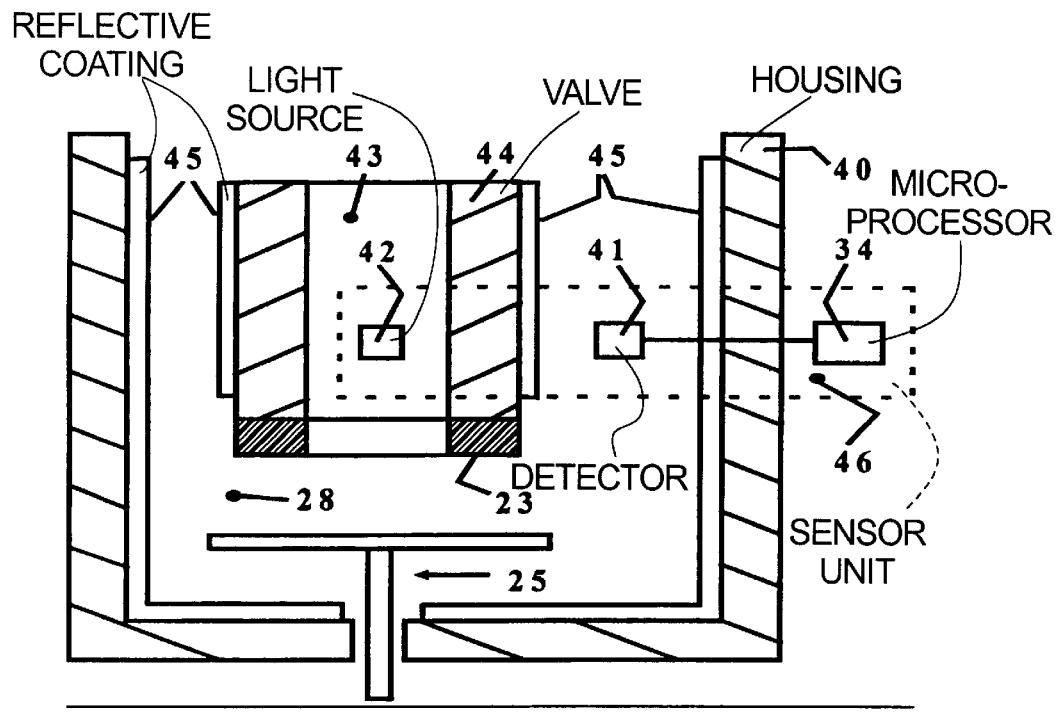
FIGS. 3a and 3b show a valve arrangement of the present invention having a light-tight housing with reflective surfaces disposed to provide multiple light reflections therein.
Figure 3B:
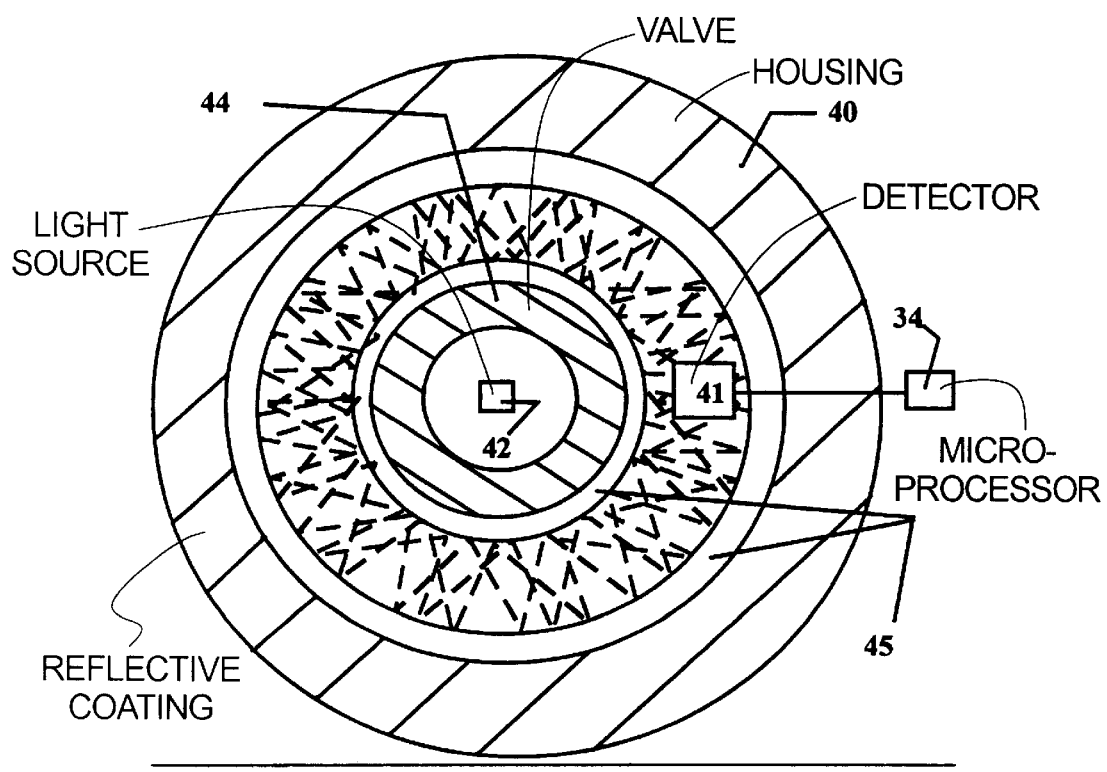

FIGS. 3a and 3b respectively show side-sectional and cross-sectional views of a portion of a valve arrangement, wherein features common with previously described arrangements are given identical reference numerals. A light-tight housing 40, similar to the housing 39 of FIG. 2, is provided in order to exclude ambient light from a detector 41. This detector 41 is arranged within the housing 40 to collect light passing from a source 42 located within an open end 43 of a valve 44. A reflective coating 45 is applied to the internal surfaces of the housing 40 so that light passing from the source 42, through an aperture 28 formed between a sealing member 23 and a closure element 25, undergoes multiple reflections within the housing (as illustrated in FIG. 3b by the broken lines which represent light paths). In this way the detector 41 senses an integrated or average light intensity of all light passing through the aperture 28. Thus the detected light intensity is substantially independent of the location of the detector 41 within the housing 40 and an integrated intensity measurement is provided without the need of the multiple detector optical fiber elements 32a ... n, such as are shown in the arrangement FIG. 2. The external walls of the valve 44 that lie within the housing 40 also can be provided with a reflective coating 45 to enhance the multiple reflections and thus also to enhance the averaging effect of the light intensity. The detector 41 provides an output proportional to the detected light intensity which is passed to a microprocessor 34. This microprocessor 34, together with the detector 41 and source 42, form a sensor unit 46 which operates substantially as previously described with respect to FIG. 2 to determine the area of the aperture 28.

It will be appreciated by those skilled in the art that variations may be made to the above described embodiments while still remaining within the scope of the invention as claimed. For example and without limitation, one or the other of the detectors 16,20 and respective optical fibers 15,19 may be removed so that the sensor unit 9 will actively detect only the open or the closed position of the valve 1. A continuous output light source may replace the pulsed source 13 with consequent changes to the detection circuitry of the sensor unit 9. The detector 16,20 and/or light source 13 may be placed to collect and/or deliver light without the need for optical fibers 14 and/or 15,19. The fiber optic bundle 32a ... n may be replaced with a number of suitably positioned photodetectors. The valve arrangement may be configured so that light entering the valves 1, 21 may be detected instead of that exiting; and ambient light may replace light from dedicated sources 13,31.

Although modifications and changes may be suggested by those skilled in the art, it is the intention of the inventor to embody within the patent warranted hereon all changes and modifications as reasonably and properly come within the scope of his contribution to the art.

I claim as my invention:

1. A valve arrangement comprising:
   a valve having a variable aperture adapted for fluid flow therethrough;
   a closure element disposed in said aperture and being adjustable to vary a size of the aperture; and
   a sensor unit which generates an output signal indicating at least whether said aperture is opened or closed by said closure element, said sensor unit including a light detector disposed to detect light passing through said aperture and to generate a detector output signal dependent on detection of said light, said output signal of said sensor unit comprising said detector output signal.

2. A valve arrangement as claimed in claim 1 wherein said sensor unit further comprises a light source disposed upstream of said aperture, relative to fluid flow through said aperture, and wherein said light detector is disposed downstream of said aperture and generates said detector output signal dependent on detection of light from said light source.

3. A valve arrangement as claimed in claim 1 wherein said light detector comprises a light detector which detects ambient light passing through said aperture.

4. A valve arrangement as claimed in claim 1 wherein said light detector comprises a light detector which emits an output, as said detector output signal, which is proportional to a level of incident light on said light detector as an indication of said size of said aperture, and wherein said output signal of said sensor unit comprises at least one component based on said detector output signal which is indicative of said size of said aperture.

5. A valve arrangement as claimed in claim 4 further comprising a first pressure gauge for measuring fluid pressure upstream of said aperture and a second pressure gauge for measuring pressure downstream of said aperture and a control unit which receives pressure measurements from said first pressure gauge and said second pressure gauge and which is supplied with said detector output signal, said control unit comprising means for calculating a flow value of fluid through said aperture from said pressure measurements and said detector output signal and for emitting a signal identifying a calculated flow value.

6. A valve arrangement as claimed in claim 5 further comprising means supplied with said calculated flow value and connected to said closure element for automatically adjusting said closure element to vary the size of said aperture dependent on said calculated flow value.

7. A valve arrangement as claimed in claim 1 wherein said sensor unit further comprises a light source, disposed upstream of said aperture, relative to fluid flow through said aperture, and wherein said light detector comprises a plurality of light-receiving elements disposed downstream of said aperture and spaced apart from each other, each of said light-receiving elements emitting an individual light-receiver output signal dependent on light having passed through an associated region of said aperture.

8. A valve arrangement as claimed in claim 1 further comprising a light-tight housing surrounding said valve and said sensor unit which prevents ambient light from reaching said light detector, and wherein said sensor unit further comprises a light source disposed upstream of said aperture, relative to fluid flow through said aperture, and wherein said light detector is disposed downstream of said aperture and exclusively detects light from said light source.

9. A valve arrangement as claimed in claim 8 wherein said light-tight housing has light-reflective internal surfaces disposed to multiply reflect light from said light source after said light passes through said aperture to produce an average intensity of said light within said light-tight housing, which is detected by said light detector.

* * * * *